United States Patent

Brown et al.

[11] Patent Number: 5,933,544
[45] Date of Patent: *Aug. 3, 1999

[54] DEPICTION OF IMAGES USING INVERSE PERSPECTIVE TRANSFORMATION TO PROVIDE 3-D EFFECT

[76] Inventors: Michael John Walter Brown, 33 Maynard Close, Pinelands, Cape Town, Cape Province; Michael John Merifield, Pierremont, Abington Circle, Fish Hoek, Cape Province, both of South Africa

[*] Notice: This patent issued on a continued prosecution application filed under 37 CFR 1.53(d), and is subject to the twenty year patent term provisions of 35 U.S.C. 154(a)(2).

[21] Appl. No.: 08/886,420

[22] Filed: Jul. 1, 1997

Related U.S. Application Data

[62] Continuation of application No. 08/736,975, Oct. 25, 1996, abandoned, which is a continuation of application No. 08/632,757, Apr. 16, 1996, abandoned, which is a continuation of application No. 08/199,230, filed as application No. PCT/GB92/01538, Aug. 20, 1992, abandoned.

[30] Foreign Application Priority Data

Aug. 23, 1991 [ZA] South Africa ................ 91/6712

[51] Int. Cl.⁶ ........................................... G06T 15/20
[52] U.S. Cl. .................. 382/276; 382/293; 40/427; 345/139
[58] Field of Search ................. 382/276, 285, 382/293, 298; 395/125, 127; 40/612, 453, 427; 345/125, 127, 139; 283/117

[56] References Cited

U.S. PATENT DOCUMENTS

| | | | |
|---|---|---|---|
| 3,631,619 | 1/1972 | Campbell et al. | 40/612 |
| 4,343,637 | 8/1982 | Bolton | 395/125 |
| 4,667,236 | 5/1987 | Dresdner | 358/160 |
| 4,841,292 | 6/1989 | Zeno | 340/736 |
| 4,956,706 | 9/1990 | Ohba | 358/93 |
| 5,283,859 | 2/1994 | Quarendon et al. | 395/127 |

FOREIGN PATENT DOCUMENTS 0 259 549 A2   3/1988   European Pat. Off. .

OTHER PUBLICATIONS

Foley et al, "Computer Graphics . . . " 1990 pp. 657–660.

Article entitled "Fun–Fair Illusions" in Time Magazine, dated Oct. 4, 1976, pp. 42 and 43.

Primary Examiner—Amelia Au
Assistant Examiner—Larry J. Prikockis
Attorney, Agent, or Firm—Clifford W. Browning; Woodard, Emhardt, Naughton, Moriarty & McNett

[57] ABSTRACT

An image, eg of an advertising or promotional nature, is depicted in an inverse perspective form on a playing field (10) for a sporting event. The playing field is imaged by means of a video camera (12) whose line of sight (14) corresponds to the line of sight used in transforming the image to its inverse perspective form, and the output of the camera then broadcast or diffused in a television broadcasting or diffusion service.

4 Claims, 2 Drawing Sheets

DEPICTION OF IMAGES USING INVERSE PERSPECTIVE TRANSFORMATION TO PROVIDE 3-D EFFECT

This application is a continuation of application Ser. No. 08/736,975, filed Oct. 25, 1996, now abandoned, which is a continuation of application Ser. No. 08/632,757 filed Apr. 16, 1996, now abandoned, which is a continuation of application Ser. No. 08/199,230, filed Feb. 23, 1995, now abandoned, which is a 371 of PCT/6092/1538 filed Aug. 20, 1992.

This invention relates to the depiction of images. More particularly, but not exclusively, it relates to the depiction of images of an advertising or promotional nature, at sporting events.

SUMMARY OF THE INVENTION

According to one aspect of the invention there is provided a method of depicting an image, which includes applying an inverse perspective transformation of the image to a surface, and imaging the surface, with the transformed image depicted thereon, by means of a moving picture camera whose line of sight corresponds to the line of sight used in transforming the image to its inverse perspective form.

The following is an explanation of what is meant by an inverse perspective transformation of an image. Images are often depicted on a surface in a perspective form. This gives an observer of the depiction the impression of depth. For example, lines that would, in three-dimensional space, be parallel to one another and extend away from the observer (ie would lie in a plane which forms a small angle with the observer's line of sight) are, in the depiction, represented as lines that converge towards a point referred to as the "vanishing point". The vanishing point lies on a horizontal line referred to as the "horizon". Likewise, points on anyone of these lines that would, in three-dimensional space, be spaced at equal intervals along the line are, in the depiction, represented as points which are spaced at intervals which become progressively smaller, the greater the distance of the points, in three-dimensional space, from the observer. The spacing between adjacent points tends to zero as the distance, in three-dimensional space, from the observer tends to infinity.

When viewing such a perspective depiction, the observer, by a process of visual or mental interpretation, visualises the converging lines as being parallel to one another in a plane extending away from the observer, and the points as being equi-distant from one another. This is so even though the surface on which the image is depicted may be at right angles to the line of sight of the observer.

By an inverse perspective transformation of an image, then, is meant a transformation of the image which is such that, when the transformed image is viewed by an observer from a position in which the line of sight of the observer intersects the surface to which the image is applied at a small angle, the observer, by a process of mental or visual interpretation, visualises the transformed image as extending in a plane extending at an angle (eg right angles) greater than said small angle to the line of sight of the observer.

The image may be of an advertising or promotional nature.

According to another aspect of the invention there is provided a method of depicting an image which is of an advertising or promotional nature, which includes applying an inverse perspective transformation of the image to a surface.

Where the surface is imaged, with the transformed image depicted on the surface, by means of a moving picture camera whose line of sight corresponds to the line of sight used in transforming the image to its inverse perspective form, the output of the camera may be broadcast or diffused in a television broadcasting or diffusion service.

The surface may be a playing surface or field for a sporting event.

The invention will now be described in more detail, by way of example, with reference to the accompanying drawings.

DESCRIPTION OF THE PREFERRED EMBODIMENT

Figure 1:
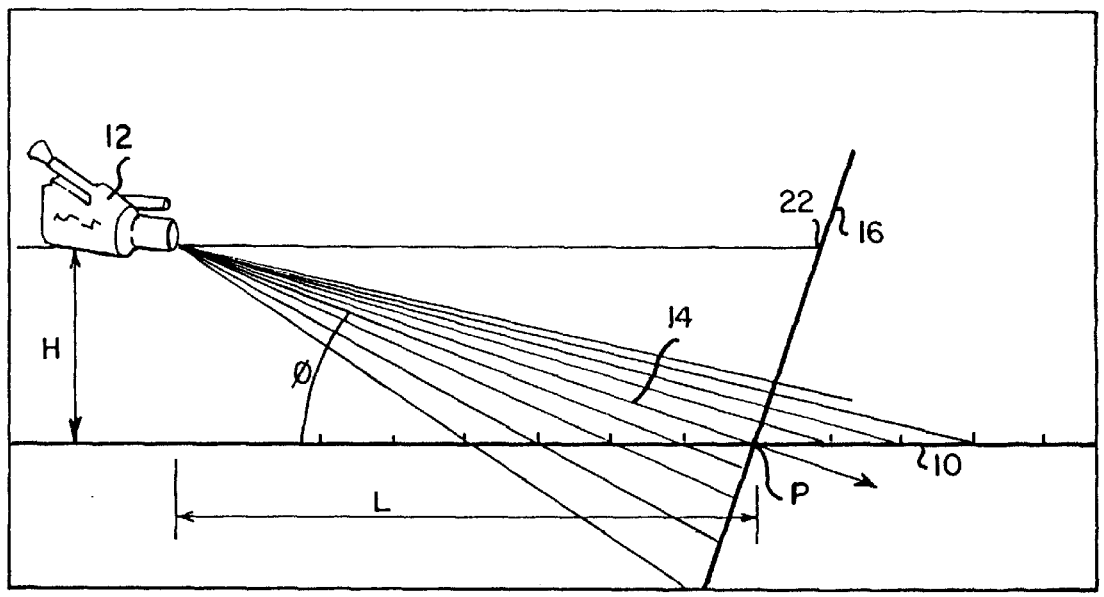
FIG. 1 is a side view illustrating the principles of the invention.

In FIG. 1, reference numeral 10 designates a ground surface and reference numeral 12 a video camera whose line of sight 14 extends at a small angle $\phi$ to the ground surface. Reference numeral 16 designates an imaginary focal plane of the video camera, which extends at right angles to the line of sight 14, at a point P (the focal point) where the line of sight intersects the ground surface 10. The video camera 12 is positioned at a height H above the ground plane and at a horizontal distance L from the focal point P.

Figure 2:
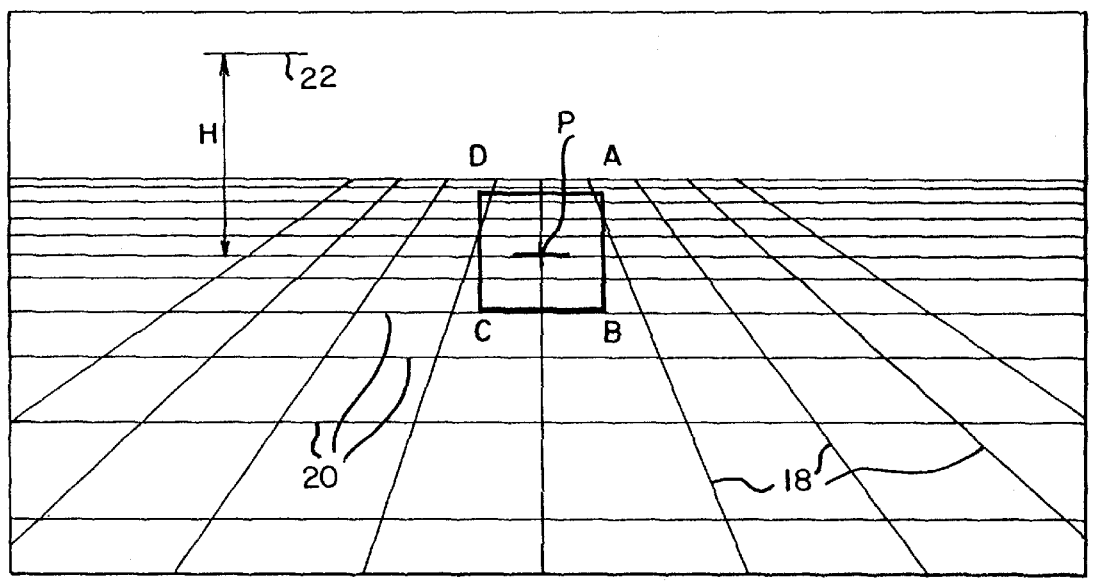
FIG. 2 illustrates a perspective grid and, superimposed thereon, a rectangular window in a focal plane extending at right angles to an observer's line of sight.

In FIG. 2 line ABCD indicates a rectangular window in the focal plane 16, the window having the focal point P at its centre. The window ABCD is superimposed on a perspective grid consisting of lines 18 and 20. The lines 18 and 20 represent lines that, in the ground plane 10, form a regular rectangular grid. The lines 18 thus converge to a vanishing point (not shown) on a horizontal line or "horizon" 22.

Figure 3:
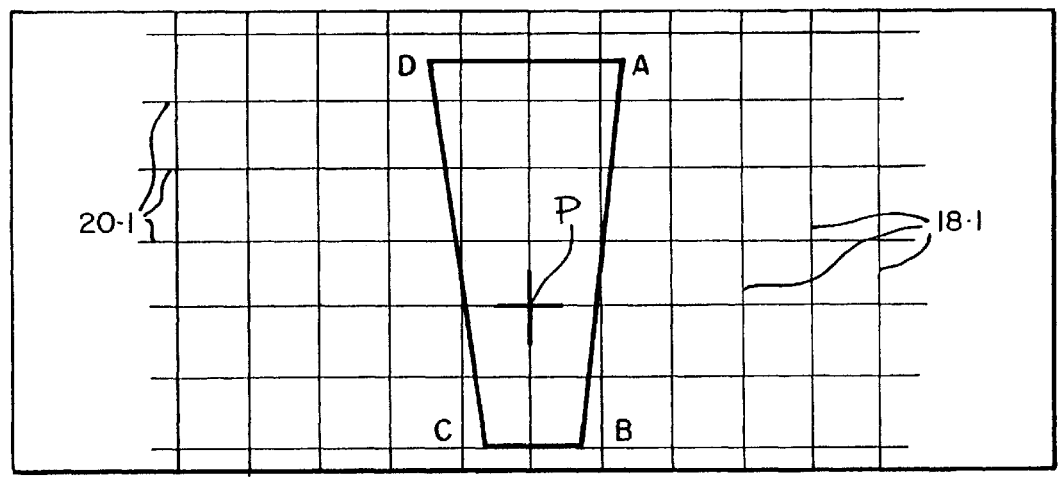
FIG. 3 illustrates the window after inverse perspective transformation thereof.

When the perspective grid illustrated in FIG. 2 is transformed to a regular rectangular grid consisting of lines 18.1 and 20.1 as shown in FIG. 3, and the same transformation applied to the rectangular window ABCD, the window ABCD becomes an elongated quadrilateral window having parallel sides BC and AD and diverging sides BA and CD. This transformation is herein referred to as an inverse perspective transformation. The same transformation can be applied to any design represented in the focal plane 16 in the window ABCD.

Figure 4:
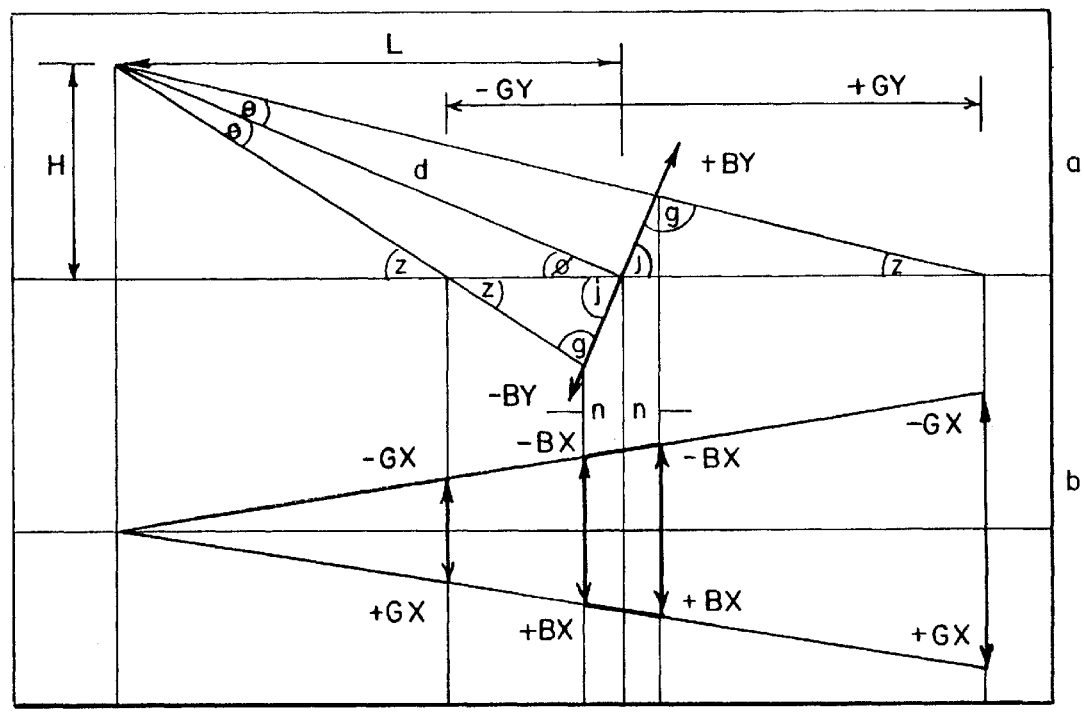
FIG. 4 is a diagrammatic side and plan view, to show the symbols used in the mathematical equations used in the inverse perspective transformation of an image from a focal plane to a ground plane.

The transformation of co-ordinates in the focal plane 16 to co-ordinates in the ground plane 10 can be represented mathematically as follows, the various symbols that are used in the equations being shown in FIGS. 4a and 4b.

A point at BX, BY in the focal plane 16 corresponds to a point at GX, GY in the ground plane 10, such that:

$$GY = \frac{H}{\tan z} - L \quad (1)$$

where $$z = (\phi - \theta) \quad (2)$$

$$\phi = \tan^{-1}\frac{H}{L} \quad (3)$$

$$\theta = \tan^{-1}\frac{BY}{d} \quad (4)$$

$$d = (H^2 + L^2)^{1/2} \quad (5)$$

if BY is positive, θ is positive
if BY is negative, θ is negative
if θ is positive, z<φ
if θ is negative, z>φ
if BY is positive, $$\frac{H}{\tan z} > L,$$

GY positive
if BY is negative, $$\frac{H}{\tan z} < L,$$

GY negative
and $$GX = \frac{H}{\tan z} - \frac{BX}{L+n} \quad (6)$$

where $$n = BY \cos j \quad (7)$$

$$j = (180° - z - g) \quad (8)$$

$$g = \sin^{-1}\left(GY \sin\frac{z}{BY}\right) \quad (9)$$

An image, which may be of an advertising or promotional nature, is transformed from focal plane co-ordinates to ground plane co-ordinates by an inverse perspective transformation as described above. It will be appreciated that this can readily be done by means of a computer. The transformed image is then applied to the ground surface 10.

Where the ground surface is a playing field for sporting events, the transformed image may be applied to the surface by means of chalk or the like marking material. TV coverage of the sporting event will cause the image to be displayed on the TV screen of every person watching the sporting event on TV. The observer will, by a process of mental or visual interpretation, visualise the image on his TV screen in the form the image had prior to the inverse perspective transformation and the image will thus appear to be in a plane at right angles to the observer's line of vision. This will cause the image to stand out, increasing its impact on the TV audience.

We claim:

1. A method of depicting an image, comprising:

providing a ground surface, an image having coordinates that define the image and a camera having a line of sight that extends to the ground surface at an angle less than approximately 45 degrees to a point of intersection where the line of sight intersects the ground surface, the point of intersection lying in a normal plane that extends at right angles to the line of sight;

transforming the coordinates of the image, as they would appear in said normal plane with the point of intersection at their center, into coordinates that would lie in the plane of the ground surface utilizing means for generating inverse perspective transformation coordinates, whereby the coordinates thereby generated that would lie in the plane of the ground surface would appear to lie in said normal plane when viewed by the camera;

applying the image to the ground surface utilizing the coordinates generated by the means for generating inverse perspective transformation coordinates; and viewing the image on the ground surface with the camera;

wherein the image is of an advertising nature and the surface is a playing surface for a sporting event.

2. The method as claimed in claim 1, wherein the camera is a moving picture camera and further including transmitting an output of the moving picture camera via a television broadcasting service.

3. A method as claimed in claim 1, wherein the camera is a moving picture camera and further including transmitting an output of the moving picture camera via a cable television service.

4. A method of depicting an image, comprising:

providing a ground surface, an image having coordinates that define the image and a camera having a line of sight that extends to the ground surface at an angle less than approximately 45 degrees to a point of intersection where the line of sight intersects the ground surface, the point of intersection lying in a normal plane that extends at right angles to the line of sight;

transforming the coordinates of the image, as they would appear in said normal plane with the point of intersection at their center, into coordinates that would lie in the plane of the ground surface utilizing means for generating inverse perspective transformation coordinates, whereby the coordinates thereby generated that would lie in the plane of the ground would appear to lie in said normal plane when viewed by the camera;

applying the image to the ground surface utilizing the coordinates generated by the means for generating inverse perspective transformation coordinates; and viewing the image on the ground surface with the camera;

wherein the surface is a playing surface for a sporting event.

* * * * *

UNITED STATES PATENT AND TRADEMARK OFFICE
CERTIFICATE OF CORRECTION

PATENT NO : 5,933,544
DATED : August 3, 1999
INVENTOR(S) : Michael John Walter Brown et al.

It is certified that error appears in the above-identified patent and that said Letters Patent are hereby corrected as shown below:

In column 1, line 10, please change "PCT/6092/1538" to --PCT/GB92/1538--.

In column 3, equation (5), please change "$d=(H^2+L^2)^{f\ ½}$" to --$d=(H^2+L^2)^{½}$--.

In column 3, equation (6), please change "-" to --*--.

Signed and Sealed this

Eighth Day of February, 2000

Attest:

Attesting Officer

Q. TODD DICKINSON

Commissioner of Patents and Trademarks